(12) United States Patent
Behrens et al.

(10) Patent No.: US 10,487,884 B2
(45) Date of Patent: Nov. 26, 2019

(54) CLUTCH MECHANISM

(71) Applicant: Premier Coil Solutions, Inc., Waller, TX (US)

(72) Inventors: Randall Dean Behrens, Sealy, TX (US); Kevin James Roman, Katy, TX (US)

(73) Assignee: Premier Coil Solutions, Inc., Waller, TX (US)

( * ) Notice: Subject to any disclaimer, the term of this patent is extended or adjusted under 35 U.S.C. 154(b) by 163 days.

(21) Appl. No.: 15/602,289

(22) Filed: May 23, 2017

(65) Prior Publication Data
US 2017/0370421 A1 Dec. 28, 2017

Related U.S. Application Data

(62) Division of application No. 15/190,702, filed on Jun. 23, 2016, now Pat. No. 9,689,437.

(51) Int. Cl.
| | |
|---|---|
| *F16D 11/14* | (2006.01) |
| *E21B 19/22* | (2006.01) |
| *F16D 25/061* | (2006.01) |
| *F16D 48/02* | (2006.01) |
| *F16D 11/00* | (2006.01) |

(52) U.S. Cl.
CPC ............. *F16D 11/14* (2013.01); *E21B 19/22* (2013.01); *F16D 25/061* (2013.01); *F16D 48/02* (2013.01); *F16D 2011/008* (2013.01)

(58) Field of Classification Search
CPC ........ F16D 11/14; F16D 48/02; F16D 25/061; F16D 2011/008; E21B 19/22; B65H 75/4405
See application file for complete search history.

(56) References Cited

U.S. PATENT DOCUMENTS

| | | | | |
|---|---|---|---|---|
| 2,426,023 | A | | 2/1944 | Jeppesen et al. |
| 2,458,065 | A | * | 1/1949 | Farrar ..................... B66D 1/36 242/397.3 |
| 3,309,066 | A | * | 3/1967 | Carlson ................... B66D 1/22 242/390.9 |
| 3,614,019 | A | | 10/1971 | Slator et al. |
| 3,715,084 | A | * | 2/1973 | Weiss, Jr. ................. B64D 1/22 242/387 |
| 3,815,846 | A | * | 6/1974 | Biewer ............. B65H 54/2866 242/157.1 |
| 4,334,670 | A | * | 6/1982 | Kawabe ................... B66D 1/38 242/397.3 |
| 4,513,772 | A | * | 4/1985 | Fisher ................ B65H 75/4407 137/355.22 |

(Continued)

FOREIGN PATENT DOCUMENTS

| | | |
|---|---|---|
| DE | 3832192 A1 | 7/1989 |
| GB | 2459134 A | 10/2009 |

OTHER PUBLICATIONS

International Search Report & Written Opinion (PCT/US2017/037445), dated Sep. 7, 2017.

*Primary Examiner* — William A. Rivera
(74) *Attorney, Agent, or Firm* — Lloyd L. Davis; Hunton Andrews Kurth LLP

(57) ABSTRACT

A clutch mechanism includes a meshing arrangement between a first plurality of teeth on a first component coupled to a driven shaft and a corresponding second plurality of teeth on a second component coupled to a driving shaft.

7 Claims, 6 Drawing Sheets

(56) References Cited

U.S. PATENT DOCUMENTS

| | | | |
|---|---|---|---|
| 4,576,240 A | | 3/1986 | Matsumoto |
| 4,635,875 A | * | 1/1987 | Apple .................. B66D 1/36 |
| | | | 242/155 BW |
| 5,690,204 A | | 11/1997 | Schonleitner |
| 5,950,953 A | | 9/1999 | Baugh et al. |
| 6,854,497 B2 | * | 2/2005 | White .................. B65H 23/063 |
| | | | 156/363 |
| 7,111,803 B2 | * | 9/2006 | Mott .................. B66D 1/38 |
| | | | 242/397.4 |
| 7,931,225 B2 | * | 4/2011 | Wang .................. B65H 75/4407 |
| | | | 137/355.21 |
| 8,720,811 B2 | * | 5/2014 | Zink .................. B65H 75/38 |
| | | | 242/397 |
| 9,689,437 B1 | | 6/2017 | Behrens et al. |
| 2002/0005451 A1 | | 1/2002 | Valverde |
| 2005/0087644 A1 | * | 4/2005 | Kim .................. B65H 75/425 |
| | | | 242/390.8 |
| 2008/0054118 A1 | | 3/2008 | Czajkowski |
| 2012/0279334 A1 | | 11/2012 | Gaully |
| 2014/0214294 A1 | | 7/2014 | Mori et al. |

\* cited by examiner

CLUTCH MECHANISM

CROSS REFERENCES

This application is a divisional application of U.S. Ser. No. 15/190,702, entitled "CLUTCH MECHANISM", filed Jun. 23, 2016, and allowed on May 3, 2017.

FIELD

Embodiments disclosed herein generally relate to a clutch mechanism. More specifically, certain embodiments disclosed herein relate to a clutch mechanism that may be used with a coiled tubing unit levelwind screw.

BACKGROUND AND SUMMARY

A clutch is a mechanical device that engages and disengages the power transmission, especially from a driving shaft to a driven shaft. In the simplest application, clutches connect and disconnect two rotating shafts.

Coiled tubing units employ clutches for operating a levelwind system in conjunction with the coiled tubing reel to guide coiled tubing onto the reel when the coiled tubing is removed from an oil or gas well and to guide the coiled tubing from the reel when the coiled tubing is injected into an oil or gas well is disclosed. Drive means are provided for rotating the coiled tubing reel and the levelwind system. The levelwind system uses a levelwind screw between two levelwind arms to move a tubing guide laterally across the coiled tubing reel in order to properly wrap and unwrap the tubing from the reel. The screw is turned at a rate proportional to the rate of reel rotation in order that the tubing guide may move at approximately the rate of the current wrap position. The levelwind system further employs the clutch to adjust the positioning of the tubing guide laterally along the levelwind screw and maintain the straightest path for the tubing from the reel through the tubing guide during spooling and un-spooling operations. Misalignment of the tubing between the reel and the tubing guide may exert undue forces and wear on equipment and inhibits deployment or retrieval speed.

Current "friction" clutches used today employ discs that perpetually wear against each other and must be replaced frequently. Inevitably, no matter the hardness of the material, the discs will wear through and break and often they last through only a few jobs before the coiled tubing unit must be taken out of service and the discs replaced. To avoid spare part expenses and maintenance downtime, some operators have even disabled the clutch, but this practice is not recommended due to the inability to control the spooling/un-spooling, without continuous operator engagement. Friction clutches also inhibit spooling new tubing onto the reel for the first time. The tubing yard uses a machine to spool new tubing on the reel, which is done with the clutch free to rotate. To allow the clutch to rotate freely, drive chains to the clutch must be removed which increases the possibility of assembly error on these components due to installation and removal frequency. What is needed then is an improved clutch mechanism.

In one aspect, embodiments disclosed herein relate to a clutch mechanism for use with a levelwind screw of a coiled tubing reel configured to guide coiled tubing onto or from a coiled tubing reel driven by a reel motor, the clutch mechanism including a meshing arrangement between a first component coupled to the levelwind screw and a second component driven by the reel motor.

In another aspect, embodiments disclosed herein relate to a method of operating a levelwind screw of a coiled tubing unit using a clutch mechanism comprising a meshing arrangement between a first component coupled to the levelwind screw and a second component driven by a reel motor. The method includes engaging the meshing arrangement and rotating the coiled tubing reel, thereby operating the levelwind screw, or disengaging the meshing arrangement and rotating the levelwind screw.

In yet another aspect, embodiments disclosed herein relate to a clutch mechanism including a meshing arrangement between a first plurality of teeth on a first component coupled to a driven shaft and a corresponding second plurality of teeth on a second component coupled to a driving shaft.

In yet another aspect, embodiments disclosed herein relate to a method of operating a levelwind screw of a coiled tubing unit using a clutch mechanism, the method including meshing a first plurality of teeth of a first component coupled to the levelwind screw with a corresponding second plurality of teeth of a second component driven by a reel motor, and operating the reel motor to rotate the coiled tubing reel, or unmeshing the first plurality of teeth from the corresponding second plurality of teeth, and rotating the levelwind screw.

BRIEF DESCRIPTION OF THE DRAWINGS

The invention is illustrated in the accompanying drawings wherein.

DETAILED DESCRIPTION

Figure 1:
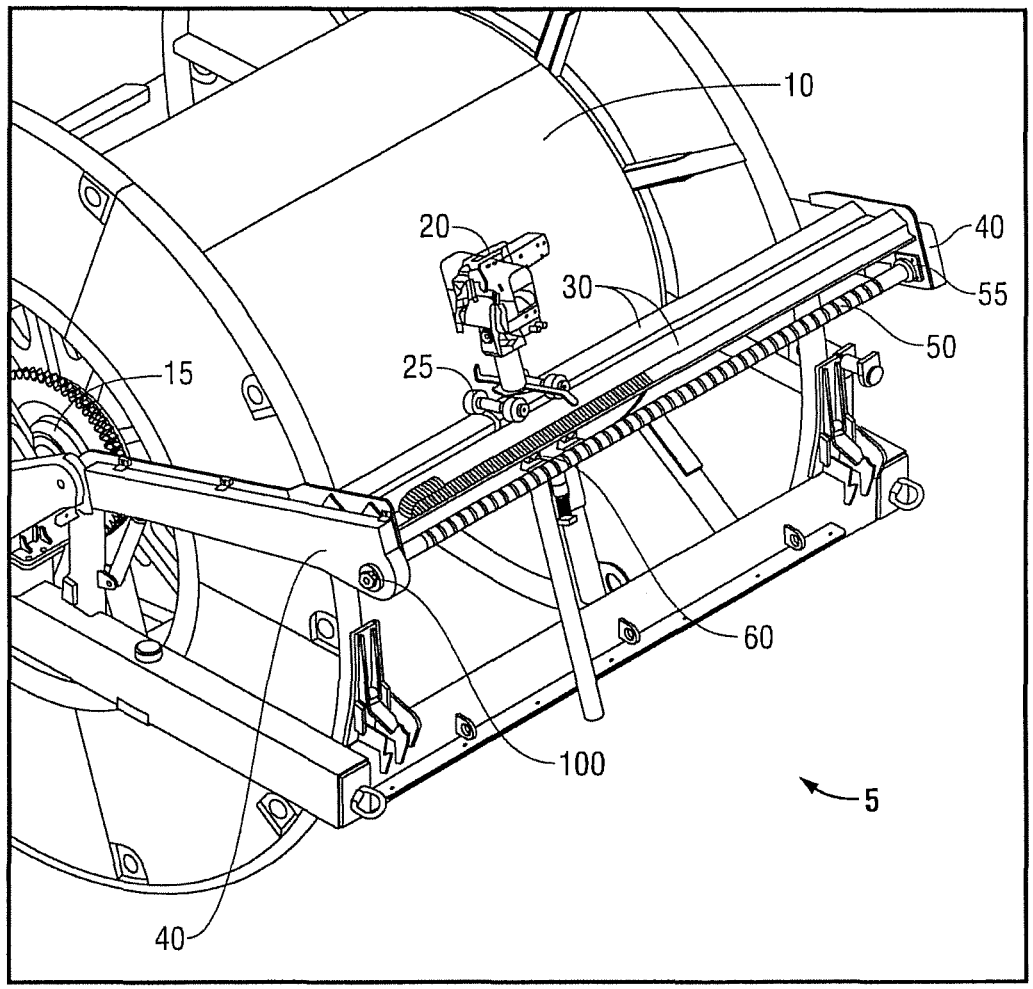
FIG. 1 illustrates a perspective view of a coiled tubing reel unit.

A clutch mechanism for use in engaging and disengaging the power transmission from a driving shaft to a driven shaft, in any application, is disclosed. For example, the clutch mechanism includes a meshing arrangement between a first plurality of teeth on a first component coupled to a driven shaft and a corresponding second plurality of teeth on a second component driven by a motor.

Further, a clutch mechanism for use with a levelwind system on a coiled tubing reel to guide coiled tubing onto a reel when the coiled tubing is removed from an oil or gas well or to guide the coiled tubing from the reel when the coiled tubing is injected into an oil or gas well is disclosed. Drive means, such as a reel motor, are provided for rotating the coiled tubing reel and the levelwind system. The levelwind system includes a levelwind screw that extends between two arms. The levelwind screw rotates and moves a tubing guide laterally across the coiled tubing reel in order to properly wrap and unwrap the tubing from the reel. The screw is turned at a rate proportional to the rate of reel rotation in order that the tubing guide may move at a rate that matches the positioning of the coiled tubing being wrapped onto or from the reel.

The clutch mechanism disclosed herein is coupled at one end to the levelwind screw. The clutch mechanism has a longitudinal axis extending there through. "Axial" or "axially" as used herein means situated along the longitudinal axis. The clutch mechanism includes a generally cylindrical weldment having a sprocket thereon, referred to as the clutch sprocket. The clutch sprocket may be integral with or attached to the weldment. The clutch sprocket may be any type of profile wheel with cogs or teeth that mesh with a chain, track or other perforated or indented material. The clutch sprocket may be any wheel upon which radial projections engage a chain passing over it. The clutch sprocket is configured to engage a chain extending from a sprocket for a coiled tubing reel motor. That is, the reel motor carries a sprocket, which drives a chain, which, in turn, drives the clutch sprocket on the weldment. The clutch mechanism further includes a generally cylindrical housing that, when assembled, axially abuts and partially overlaps the weldment. At times, the weldment rotates relative to the cylindrical housing.

A shaft having a first end coupled to the levelwind screw extends axially through the clutch mechanism. The shaft may have a socket on the first end configured to couple with the levelwind screw. A key may be inserted within corresponding notches in the socket and the levelwind screw to restrict relative movement between the shaft and levelwind screw. The shaft engages one or more radial bearing assemblies press fit within the weldment and housing, and the shaft is rotatable relative to the weldment and housing. The shaft further includes a flange having a circumferential channel, referred to as the "shaft channel".

The clutch mechanism further includes a generally cylindrical component referred to as a "spider" concentrically disposed about a portion of the shaft. The spider is disposed at an axial location along the shaft proximate to the flange. The spider may be integrally formed on the shaft or attached. The spider is configured to rotate with the shaft, that is, the spider and the shaft do not rotate relative to each other. In one example, the shaft is configured having a notch recessed in its outer surface, the spider is configured having a notch cut in an inner surface, and a key that corresponds with the notches is inserted into the notches to prevent relative rotation between the shaft and the spider. In another example, a spline engagement between the spider and shaft may be used. Relative rotation between the shaft and the spider may be restricted by other means as well.

One or more springs are disposed within the shaft channel. One or more dowel pins may extend from the spider, disposed axially adjacent to the shaft channel, concentrically within the one or more springs. The springs are configured to bias the spider axially in a direction away from the weldment. The springs may be coil springs or any type of spring. The springs may have any amount of spring force or spring rate.

The "clutch" engagement described herein is a meshing arrangement between a plurality of radially outward projections spaced around a circumference of the spider, referred to as "teeth", and a plurality of longitudinal projections spaced around a face of the weldment axially adjacent to the spider, also referred to as "teeth" or corresponding teeth. The plurality of longitudinal projections spaced around a circumference of the weldment forms an undulating surface, i.e., longitudinal projections having valleys in between. It is understood that any number of teeth spaced around the circumference of the spider and weldment, equally or unequally, may be used.

The spider teeth are spaced around a circumference of the spider having notches in between. Each spider tooth has a flat surface substantially parallel with a plane perpendicular to the longitudinal axis of the clutch mechanism, and surfaces angled relative to a plane perpendicular to the longitudinal axis of the clutch mechanism on either end of the flat surface. Each spider tooth may have a width that is less than two inches, or less than one and one-half (1½) inch, or less than one inch; each spider tooth 130 may have a height that is less than one inch, or less than three-quarters (¾) inch, or less than five-eights (⅝) inch, or less than one-half (½) inch, or less than three-eighths (⅜) inch, or less than one-quarter (¼) inch.

Similarly, the weldment teeth are spaced around a circumference of a face of the weldment having valleys in between, thereby forming an undulating surface. Each tooth has a flat surface substantially parallel with a plane perpendicular to the longitudinal axis 101 of the clutch mechanism, and surfaces angled relative to a plane perpendicular to the longitudinal axis of the clutch mechanism on either end of the flat surface. Each tooth may have a width less than two inches, or less than one and one-half (1½) inch, or less than one inch, or less than three-quarters (¾) inch; each tooth 135 may have a height less than one inch, or less than three-quarters (¾) inch, or less than five-eights (⅝) inch, or less than one-half (½) inch, or less than three-eighths (⅜) inch, or less than one-quarter (¼) inch.

The angled surfaces of the teeth may be angled at less than 60 degrees, or less than 50 degrees, or less than 45 degrees, or less than 40 degrees, or less than 35 degrees, or less than 25 degrees, relative to a plane perpendicular to the longitudinal axis of the clutch mechanism. Corresponding surfaces may be configured having the same or substantially the same angles, or alternatively, corresponding surfaces may be configured having different angles.

The spider teeth may have angular surfaces for linear radial contact upon initially engaging corresponding weldment teeth. For example, each of the spider and weldment teeth may have an angular surface of up to ten degrees, or up to 15 degrees, or up to 25 degrees, or up to 35 degrees, or up to 45 degrees, or up to 55 degrees relative to a plane perpendicular to the longitudinal axis of the clutch mechanism.

The meshing arrangement may be actuated in a number of ways, including, but not limited to, hydraulic, electric, magnetic, or pneumatic. In one embodiment, the meshing arrangement may be actuated and engaged by inputting pressurized fluid, such as air or liquid (e.g., hydraulic fluid) through a fluid inlet port and into a fluid chamber on a side of the spider opposite from the weldment, thereby moving the spider toward the weldment and engaging corresponding meshing gears. The fluid pressure overcomes the spring force biasing the spider axially away from the weldment. Generally during spooling and un-spooling operations of coiled tubing the meshing arrangement is engaged. The coiled tubing reel motor is turning the clutch sprocket, thereby turning the spider and shaft through the engaged meshing arrangement, and thereby turning the levelwind screw.

The meshing arrangement is disengaged when fluid pressure is shut off through the air inlet port and evacuated from the fluid chamber. Accordingly, without pressurized fluid urging the spider teeth into engagement with the weldment teeth, the springs bias the spider axially away from the weldment, thereby disengaging the meshing arrangement. The coiled tubing reel motor is stopped and therefore the clutch sprocket on the weldment no longer rotates the levelwind screw. Instead, a separate motor at an opposite end of the levelwind screw, known as an override motor, begins rotating the levelwind screw. Because the shaft and spider are no longer engaged through the meshing arrangement with the weldment, the shaft and spider rotate with the levelwind screw relative to the weldment.

FIG. 1 illustrates a perspective view of a coiled tubing reel unit 5. A reel 10 is rotated by a motor and coiled tubing (not shown) is fed from or onto the reel 10 at a controlled rate through a counter 20. The counter 20 is mounted on a carrier 25 which moves laterally, for example by rollers, along counter rails 30. A levelwind screw 50 is attached between two levelwind arms 40. The levelwind screw 50 has helical grooves along its length. The counter 20 is attached by a clamp 60 to the levelwind screw 50 and as the levelwind screw 50 turns, due to engagement with the helical grooves, the clamp 60, and in turn the counter 20, is propelled back and forth laterally along the width of the reel 10. Thus, as coiled tubing comes off or is put back on along the width of the reel 10, the counter 20 also moves laterally along the width of the reel 10 on counter rails 30.

Figure 2:
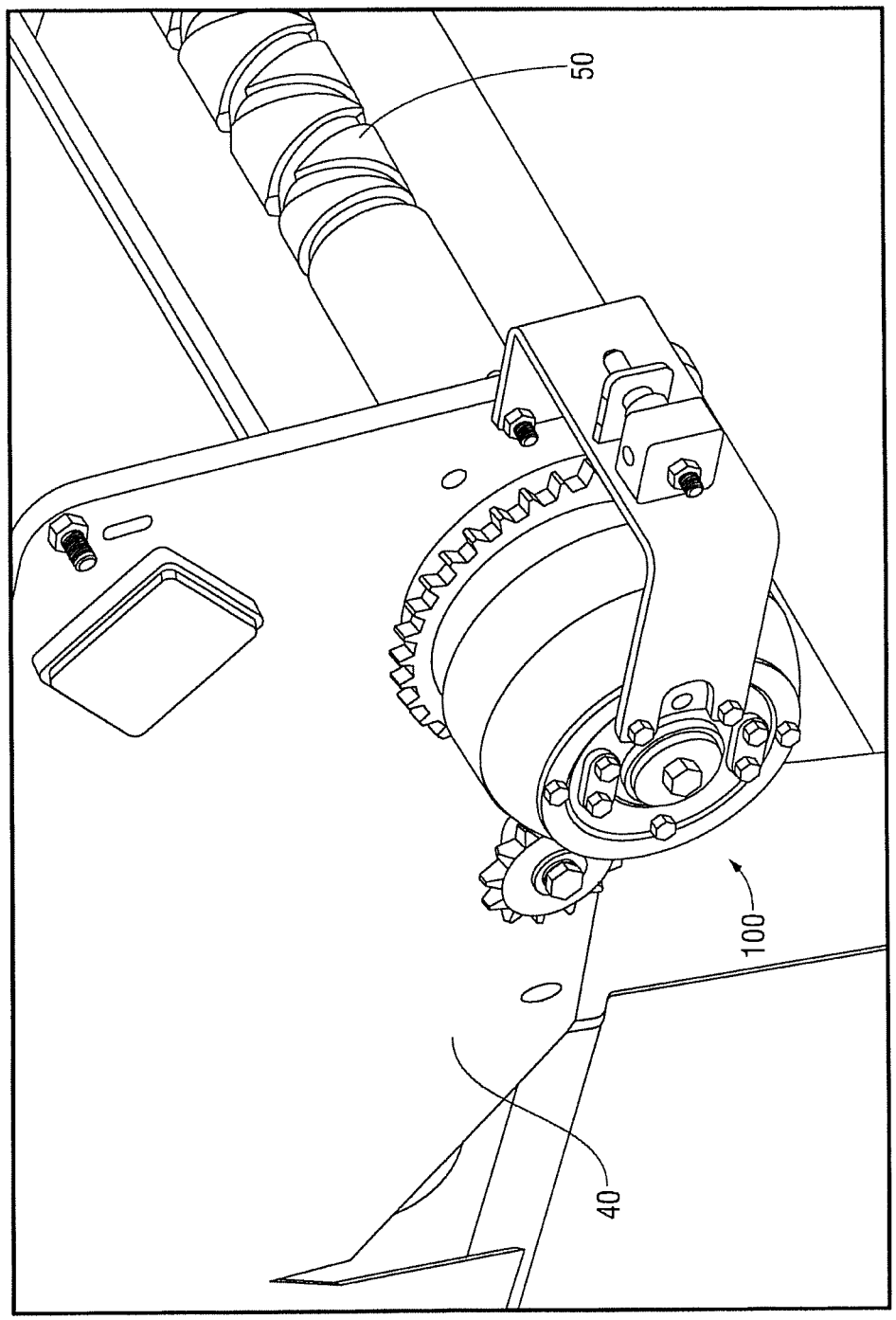
FIG. 2 illustrates an enlarged perspective view of a clutch mechanism attached to a levelwind screw of a coiled tubing reel unit of FIG. 1.

Sometimes during operation, coiled tubing does not come off or go back onto the reel 10 as evenly as it should, yet the counter 20 still advances, driven by the rotating levelwind screw 50. In this case, the levelwind screw 50 is manually adjusted to realign the counter 20 and thereby realign the coiled tubing coming off or going back onto the reel 10. A clutch mechanism 100 described herein is used with the levelwind system on the coiled tubing reel—as further illustrated in FIG. 2—to evenly guide coiled tubing onto a reel 10 when the coiled tubing is removed from an oil or gas well or to guide the coiled tubing from the reel 10 when the coiled tubing is injected into an oil or gas well.

Figure 3:
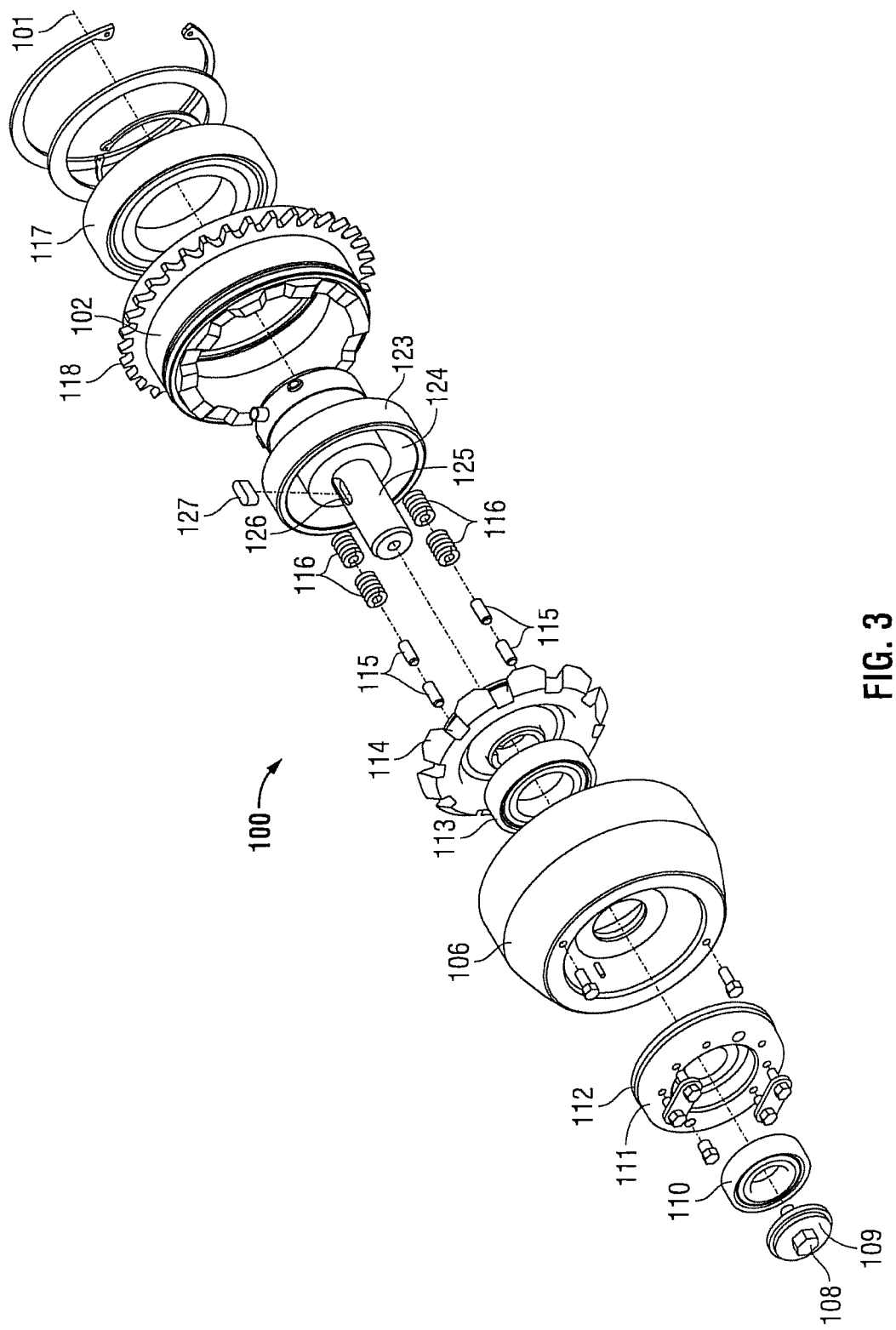
FIG. 3 illustrates an exploded perspective view of a clutch mechanism in accordance with an embodiment.
Figure 4:
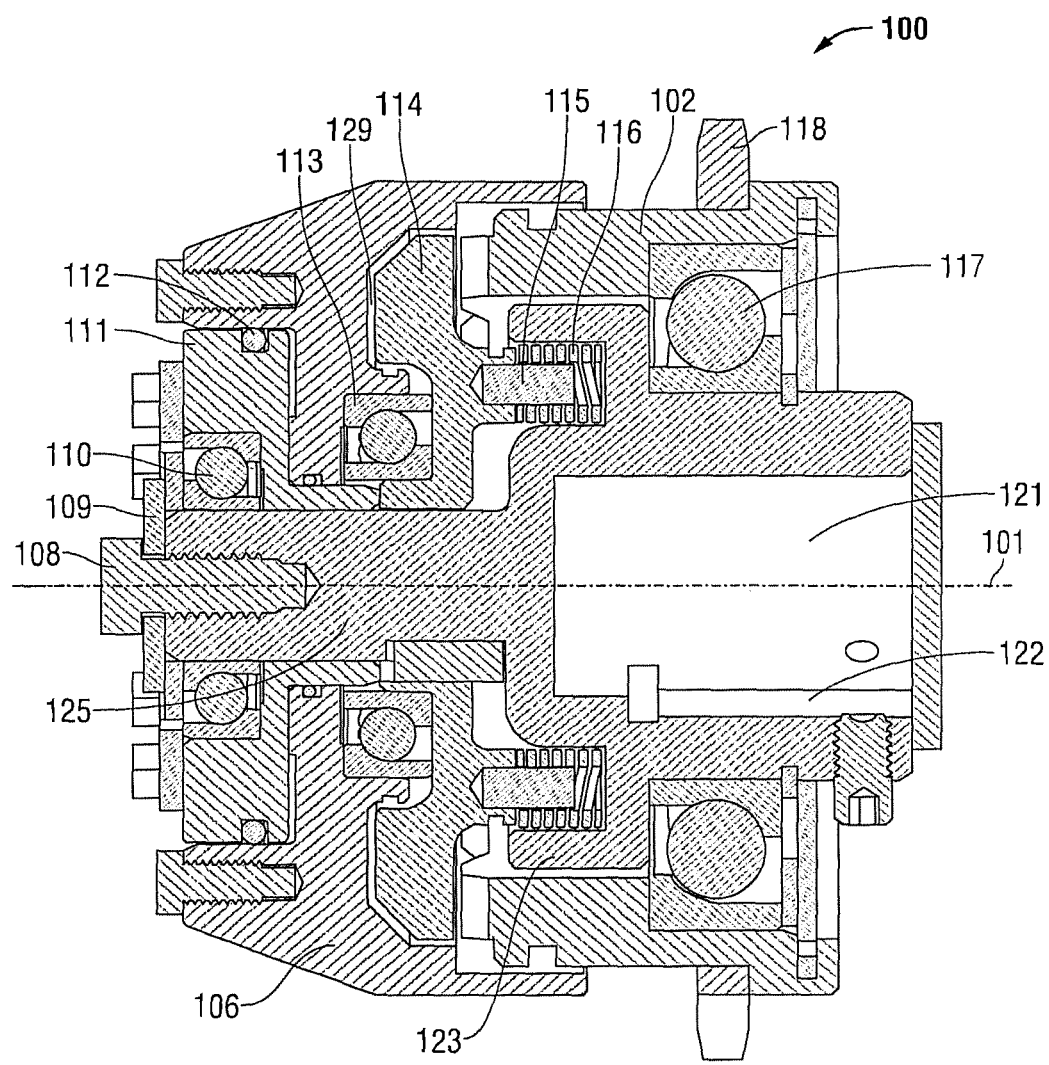
FIG. 4 illustrates a section view of a clutch mechanism

FIGS. 3 and 4 depict exploded and section views, respectively, of the clutch mechanism 100 components described herein. The clutch mechanism 100 has a longitudinal axis 101 and includes a generally cylindrical weldment 102 having a sprocket 118 thereon, referred to as the clutch sprocket. The clutch sprocket 118 is configured to engage a chain (not shown) extending from a sprocket (not shown) for a coiled tubing reel motor 15. That is, the reel motor carries a sprocket, which drives a chain, which, in turn, drives the clutch sprocket 118 on the weldment 102. The clutch mechanism 100 further includes a generally cylindrical housing 106 that, when assembled, axially abuts and partially overlaps the weldment 102. At times, the weldment 102 rotates relative to the stationary cylindrical housing 106.

A shaft 125 having a first end coupled to the levelwind screw 50 (FIGS. 1 and 2) extends axially through the clutch mechanism 100. The shaft may have a socket 121 on the first end configured to couple with the levelwind screw 50. For example, a key may be inserted within corresponding notches 122 in the socket 121 and the levelwind screw 50 to restrict relative movement between the shaft 125 and levelwind screw 50. The shaft 125 engages one or more radial rotatable bearing assemblies 110, 113, 117 press fit within the weldment 102 and housing 106, and the shaft 125 is rotatable relative to the weldment 102 and housing 106. The shaft 125 may be secured at a second end by an end plate 111 disposed within an end of the housing 106, a washer 109 abutting the end plate 111, and a bolt 108 inserted into the second end of the shaft 125. A seal 112, e.g., an O-ring, is disposed radially between the end plate 111 and the housing 106. The shaft 125 further includes a flange 123 having a circumferential channel 124, referred to as the "shaft channel", described in greater detail below.

The clutch mechanism 100 further includes a generally cylindrical component referred to as a "spider" 114 concentrically disposed about a portion of the shaft 125. The spider 114 is disposed at an axial location along the shaft 125 proximate to the flange 123. The spider 114 is configured to rotate with the shaft 125, that is, the spider 114 and the shaft 125 do not rotate relative to each other. In one example, the shaft 125 is configured having a notch 126 recessed in its outer surface, the spider 114 is configured having a notch cut in an inner surface, and a key 127 that corresponds with the notches is inserted into the notches to prevent relative rotation between the shaft 125 and the spider 114. Relative rotation between the shaft 125 and the spider 114 may be restricted by other means as well.

One or more springs 116 are disposed within the shaft channel 124. One or more dowel pins 115 may extend from the spider 114, disposed axially adjacent to the shaft channel 124, concentrically within the one or more springs 116. The springs 116 are configured to bias the spider 114 axially in a direction away from the weldment 102.

Figure 5:
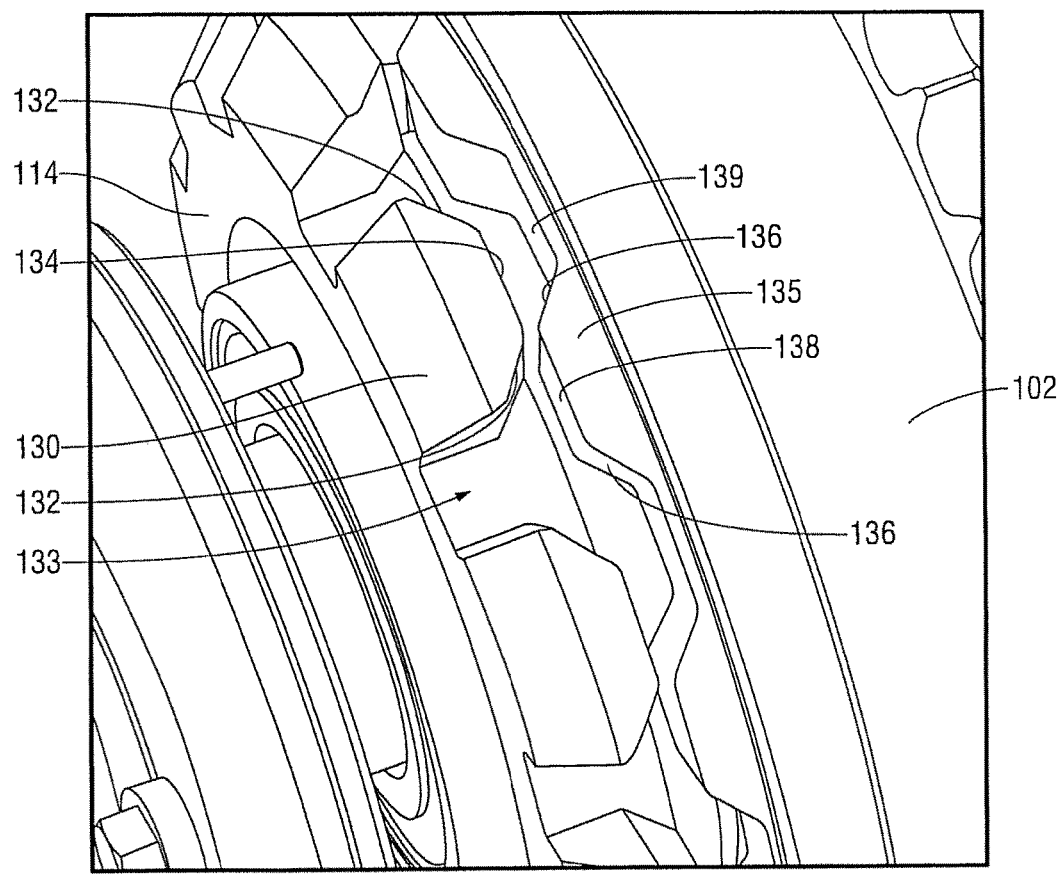
FIG. 5 illustrates a perspective view of a meshing arrangement of the clutch mechanism in accordance with an embodiment.

FIG. 5 illustrates a meshing arrangement—the "clutch" engagement—between a plurality of teeth 130 formed as radially outward projections spaced around a circumference of the spider 114 ("spider teeth"), and a plurality of teeth 135 formed as longitudinal projections ("weldment teeth") spaced around a face of the weldment 102 axially adjacent to the spider 114. The weldment teeth 135 form an undulating surface, i.e., longitudinal projections having valleys 139 in between, around a circumference of the weldment 102. While embodiments illustrated show ten teeth spaced around the circumference of the spider and the sprocket weldment, it is understood that any number of teeth spaced around the circumference of the spider, equally or unequally, may be used.

The plurality of teeth 130 are spaced around a circumference of the spider 114 having notches 133 in between. The spider 114 is generally a cylindrical flat plate and the teeth 130 may be formed by radial cuts inward from an outer circumference of the spider 114. Each spider tooth 130 has a flat surface 134 substantially parallel with a plane perpendicular to the longitudinal axis 101 of the clutch mechanism 100, and surfaces 132 angled relative to a plane perpendicular to the longitudinal axis 101 of the clutch mechanism 100 on either end of the flat surface 134. Each spider tooth 130 may have a width that is less than two inches, or less than one and one-half (1½) inch, or less than one inch; each spider tooth 130 may have a height that is less than one inch, or less than three-quarters (¾) inch, or less than five-eights (⅝) inch, or less than one-half (½) inch, or less than three-eighths (⅜) inch, or less than one-quarter (¼) inch.

Similarly, the weldment teeth 135 are spaced around a circumference of a face of the weldment 102 having valleys 139 in between, thereby forming an undulating surface. Each weldment tooth 135 has a flat surface 138 substantially parallel with a plane perpendicular to the longitudinal axis 101 of the clutch mechanism 100, and surfaces 136 angled relative to a plane perpendicular to the longitudinal axis 101 of the clutch mechanism 100 on either end of the flat surface 138. Each weldment tooth 135 may have a width less than two inches, or less than one and one-half (1½) inch, or less than one inch, or less than three-quarters (¾) inch; each weldment tooth 135 may have a height less than one inch, or less than three-quarters (¾) inch, or less than five-eights (⅝) inch, or less than one-half (½) inch, or less than three-eighths (⅜) inch, or less than one-quarter (¼) inch.

The surfaces 132, 136 may be angled at less than 60 degrees, or less than 50 degrees, or less than 45 degrees, or less than 40 degrees, or less than 35 degrees, or less than 25 degrees, relative to a plane perpendicular to the longitudinal axis 101 of the clutch mechanism 100. Corresponding surfaces 132, 136 may be configured having the same or substantially the same angles, or alternatively, corresponding surfaces 132, 136 may be configured having different angles.

Referring to FIGS. 3, 4, and 5, the clutch mechanism 100 meshing arrangement is engaged by inputting a pressurized fluid, such as air or hydraulic fluid, through a fluid inlet port and into a chamber 129 on a side of the spider 114 opposite from the weldment 102, thereby moving the spider 114 toward the weldment 102 and engaging corresponding meshing teeth 130, 135. Fluid pressure overcomes force from the springs 116 biasing the spider 114 axially away from the weldment 102. Generally during spooling and un-spooling operations of coiled tubing the meshing arrangement is engaged. The coiled tubing reel motor 15 (FIG. 1) is turning the clutch sprocket 118, thereby turning the spider 114 and shaft 125 through the engaged meshing arrangement, i.e., corresponding meshed teeth 130, 135, and thereby turning the levelwind screw 50 (FIG. 1).

The clutch mechanism 100 meshing arrangement is disengaged when fluid flow is shut off through the fluid inlet port and evacuated from the chamber 129. Accordingly, without pressurized fluid urging the spider teeth 130 into engagement with the weldment teeth 135, the springs 116 bias the spider 114 axially away from the weldment 102, thereby disengaging the meshing arrangement, i.e., moving the spider teeth 130 out of engagement with the weldment teeth 135. The coiled tubing reel motor 15 (FIG. 1) is stopped and therefore the clutch sprocket 118 on the weldment 102 no longer rotates the levelwind screw 50 (FIG. 1). Instead, a separate hydraulic motor 55 (FIG. 1) at an opposite end of the levelwind screw 50, known as an override motor, begins rotating the levelwind screw 50. Because the shaft 125 and spider 114 are no longer engaged through the meshing arrangement with the weldment 102, the shaft 125 and spider 114 rotate with the levelwind screw 50.

Figure 6:
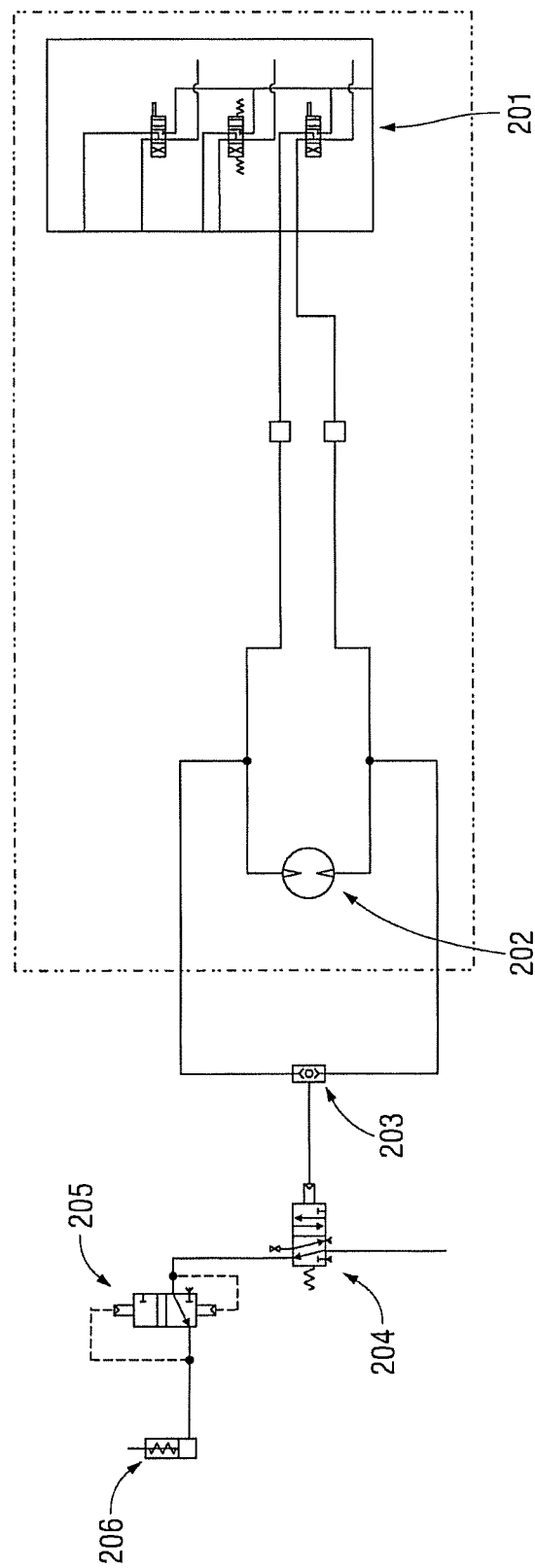
FIG. 6 illustrates a schematic view of a control circuit associated with a clutch mechanism in accordance with an embodiment.

FIG. 6 depicts one embodiment of a hydraulic/pneumatic control circuit for the clutch mechanism. The control circuit includes a directional valve 201 that controls flow directed to the levelwind override system. Activating the handle for the directional valve 201 in one direction will send flow to the levelwind override motor 202 which will cause the levelwind screw to advance at a faster rate than the reel is driving it. Activating the handle in the opposite direction will cause the levelwind screw to rotate in the opposite direction. The result of this movement is that the tubing counter moves along the width of the reel allowing the operator to accurately position the tubing when wrapping on or off the tubing reel.

The control circuit further includes a shuttle valve 203 that is connected in parallel to the hydraulic lines powering the levelwind override motor 202. The shuttle valve 203 senses a pressure differential when the override motor 202 is actuated in either direction. This pressure differential, in turn, pilots a 2-position, 5-way valve 204. When the clutch meshing arrangement is engaged, air is allowed to pass through valve 204 and through an exhaust valve 205 to provide air pressure to the clutch mechanism 206. To disengage the clutch meshing arrangement, pressure is sent from the shuttle valve 203 to the pilot port of valve 204 and the valve 204 shifts to block air pressure from reaching the clutch mechanism 206. At this point, the exhaust valve 205 also shifts to quickly exhaust air from the clutch mechanism 206, thereby allowing the springs within the clutch to disengage the meshing arrangement within the clutch.

Advantageously, embodiments disclosed herein provide a clutch mechanism that does not experience the large amount of wear due to the friction in prior clutches. In turn, the life of the clutch mechanism disclosed herein is significantly increased.

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims.

What is claimed is:

1. A method of operating a levelwind screw of a coiled tubing unit using a clutch mechanism comprising a meshing arrangement between a first component coupled to the levelwind screw and a second component driven by a reel motor, the method comprising:
    engaging the meshing arrangement;
    operating a reel motor, and rotating the coiled tubing reel, thereby rotating the levelwind screw through the engaged meshing engagement;
    disengaging the meshing arrangement and stopping the reel motor; and
    operating a second motor and rotating the levelwind screw.

2. The method of claim 1, wherein the meshing arrangement comprises a first plurality of teeth on the first component, and a corresponding second plurality of teeth on the second component.

3. The method of claim 2, wherein the first component is configured to rotate with the second component when the first plurality of teeth is engaged with the corresponding second plurality of teeth.

4. The method of claim 2, wherein the first plurality of teeth and the corresponding second plurality of teeth comprise angled surfaces.

5. The clutch mechanism of claim 4, wherein the angled surfaces are angled less than 45 degrees relative to a plane perpendicular to a longitudinal axis of the clutch mechanism.

6. A method of operating a levelwind screw of a coiled tubing unit using a clutch mechanism, the method comprising:
    engaging a meshing arrangement between a first component coupled to the levelwind screw and a second component driven by a reel motor, and operating the reel motor to rotate the coiled tubing reel and thereby rotate the levelwind screw,
    disengaging the meshing arrangement, and rotating the levelwind screw without operating the reel motor.

7. The method of claim 6, further comprising operating at least one valve configured to permit fluid to mesh a first plurality of teeth of the first component with a corresponding second plurality of teeth of the second component, or restrict fluid to unmesh the first plurality of teeth from the corresponding second plurality of teeth.

* * * * *